United States Patent
Lynch et al.

(10) Patent No.: US 12,307,262 B2
(45) Date of Patent: *May 20, 2025

(54) DYNAMIC DISTRIBUTION OF CONTAINER IMAGES

(71) Applicant: Ab Initio Technology LLC, Lexington, MA (US)

(72) Inventors: Frank Lynch, Lexington, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,173

(22) Filed: Oct. 23, 2023

(65) Prior Publication Data

US 2024/0126561 A1    Apr. 18, 2024

Related U.S. Application Data

(63) Continuation of application No. 16/656,886, filed on Oct. 18, 2019, now Pat. No. 11,836,505.

(Continued)

(51) Int. Cl.
*G06F 9/445*    (2018.01)
*G06F 8/61*    (2018.01)
(Continued)

(52) U.S. Cl.
CPC ............... *G06F 9/445* (2013.01); *G06F 8/63* (2013.01); *G06F 9/451* (2018.02); *G06F 9/45545* (2013.01); *G06F 9/5072* (2013.01)

(58) Field of Classification Search
CPC . G06F 8/63; G06F 9/445; G06F 9/451; G06F 9/45545; G06F 9/5072
See application file for complete search history.

(56) References Cited

U.S. PATENT DOCUMENTS

| 5,966,072 A | 10/1999 | Stanfill et al. |
| 8,407,360 B2 | 3/2013 | Andrade et al. |

(Continued)

FOREIGN PATENT DOCUMENTS

| JP | 2017-538204 | 12/2017 |
| WO | WO 2011/105091 | 9/2011 |

OTHER PUBLICATIONS

Office Action in Japanese Appln. No. 2021-565877, mailed on Feb. 29, 2024, 9 pages (with English translation).

(Continued)

*Primary Examiner* — Qing Chen
*Assistant Examiner* — Amir Soltanzadeh
(74) *Attorney, Agent, or Firm* — Fish & Richardson P.C.

(57) ABSTRACT

A method implemented by a data processing system including: accessing the container image that includes the first application and a second application; determining, by the data processing system, the number of parallel executions of the given module of the first application; for the given module, generating a plurality of instances of the container image in accordance with the number of parallel executions determined, for each instance, configuring that instance to execute the given module of the first application; causing each of the plurality of configured instances to execute on one or more of the host systems; and for at least one of the plurality of configured instances, causing, by the second application of that configured instance, communication between the data processing system and the one or more of the host systems executing that configured instance.

24 Claims, 12 Drawing Sheets

Related U.S. Application Data

(60) Provisional application No. 62/844,430, filed on May 7, 2019.

(51) Int. Cl.
  *G06F 9/451* (2018.01)
  *G06F 9/455* (2018.01)
  *G06F 9/50* (2006.01)

(56) References Cited

U.S. PATENT DOCUMENTS

| | | | |
|---|---|---|---|
| 9,256,467 B1 | 2/2016 | Singh et al. | |
| 9,983,891 B1 | 5/2018 | Christensen | |
| 11,836,505 B2 | 12/2023 | Lynch et al. | |
| 2005/0210262 A1 | 9/2005 | Rolia et al. | |
| 2007/0011668 A1 | 1/2007 | Wholey et al. | |
| 2012/0167112 A1 | 6/2012 | Harries et al. | |
| 2014/0245298 A1 | 8/2014 | Zhou et al. | |
| 2015/0120928 A1 | 4/2015 | Gummaraju et al. | |
| 2015/0309849 A1* | 10/2015 | Lau | G06F 21/52 |
| | | | 719/329 |
| 2016/0162320 A1* | 6/2016 | Singh | G06F 9/5005 |
| | | | 718/1 |
| 2017/0244593 A1 | 8/2017 | Rangasamy et al. | |
| 2018/0165129 A1* | 6/2018 | Chu | G06F 9/485 |
| 2018/0173502 A1* | 6/2018 | Biskup | G06F 21/56 |
| 2018/0336123 A1 | 11/2018 | Benes et al. | |
| 2019/0123970 A1 | 4/2019 | Rastogi et al. | |
| 2019/0196804 A1 | 6/2019 | Li | |
| 2019/0272205 A1 | 9/2019 | Jiang et al. | |
| 2020/0356376 A1 | 11/2020 | Lynch et al. | |

OTHER PUBLICATIONS

Burns et al. "Borg, Omega, and Kubernetes" Communications of the ACM. vol. 59, No. 5, pp. 50-55 (May 2016).
Grandl et al. "Multi-Resource Packing for Cluster Schedulers", 12 pages.
International Preliminary Report on Patentability in International Appln. No. PCT/US2020/031772, dated Nov. 18, 2021, 13 pages.
Microstrategy, Inc. "Data warehouse and project interaction: Warehouse Catalog". Mar. 15, 2017, 2 pages.
Office Action in Canadian Appln. No. 3,139,510, mailed on Jan. 26, 2024, 7 pages.
Office Action in European Appln. No. 20729377.0, dated Mar. 13, 2023, 15 pages.
Office Action in Singapore Appln. No. 11202112124Q, mailed on Feb. 15, 2024, 7 pages.
PCT International Search Report and Written Opinion in International Appln. No. PCT/US2020/031772, dated Jul. 27, 2020, 15 pages.
Turnbull et al., "The Docker Book," Sep. 2, 2014, retrieved from URL<https:/Asi.vc.ehu.eus/pablogn/docencia/manuales/The%20Docker%20Book.pdf>, 335 pages.
Vavilapalli et al. "Apache Hadoop YARN: Yet Another Resource Negotiator", 16 pages.
Verma et al. "Large-scale cluster management at Good with Borg", Google, Inc. 18 pages.
Wu et al. "FAS: A Flow Aware Scaling Mechanism for Stream Processing Platform Service based on LMS" pp. 280-284.
Notice of Acceptance in Australian Appln. No. 2020267509, mailed on Jun. 25, 2024, 4 pages.
Office Action in Japanese Appln. No. 2021-565877, mailed on Aug. 30, 2024, 8 pages (with English translation).
Office Action in Canadian Appln. No. 3,139,510, mailed on Oct. 29, 2024, 8 pages.

* cited by examiner

DYNAMIC DISTRIBUTION OF CONTAINER IMAGES

CLAIM OF PRIORITY

This application claims priority under 35 U.S.C. § 119(e) to U.S. Patent Application Ser. No. 62/844,430, filed on May 7, 2019, the entire contents of which are hereby incorporated by reference.

BACKGROUND

Applications that run on computing systems require a portion of the computing system's computational resources to do so. The computing system must therefore manage allocation of its resources to applications running thereon. Some examples of resources that are allocated to applications include access to a portion of the computing system's memory, access to file data, and access to a required amount of processing power.

SUMMARY

In one aspect, in general, a method implemented by a data processing system for causing execution of instances of a container image on a plurality of host systems, wherein each container image includes a first application with a plurality of modules, and wherein the instances are configured to execute a given module in accordance with a determined number of parallel executions of that given module, with the method including: accessing the container image that includes the first application and a second application, wherein the second application causes a communication between the data processing system and a host system executing an instance of the container image; determining, by the data processing system, the number of parallel executions of the given module of the first application; for the given module, generating a plurality of instances of the container image in accordance with the number of parallel executions determined, with each instance including the first and second applications; for each instance, configuring that instance to execute the given module of the first application; causing each of the plurality of configured instances to execute on one or more of the host systems; and for at least one of the plurality of configured instances, causing, by the second application of that configured instance, communication between the data processing system and the one or more of the host systems executing that configured instance. Other embodiments of this aspect include corresponding computer systems, apparatus, and computer programs recorded on one or more computer storage devices, each configured to perform the actions of the methods.

In this example, the operations include accessing a specification that specifies a number of parallel executions of a given module. The container image is a first container image, and wherein the method further includes: accessing from a hardware storage device an instance of a second container image, wherein the second container image includes the first application and specifies an amount of parallelism for each module in the second application; and storing the second container image on an execution system. The operations also include transmitting, from the instance of the second container image, a request to an interface included in the execution system to generate the plurality of instances of the container image in accordance with the number of parallel executions determined. The operations also include assigning each of the plurality of configured instances to one or more of the host systems. Assigning is dynamically performed by each configured instance being assigned at run-time and the assignments not being pre-determined. The first application is a dataflow graph with a plurality of components, the operations further including: for each component, generating a plurality of instances of the container image in accordance with a number of parallel executions determined for that component; and dynamically running a dataflow graph on multiple nodes to obtain dynamic levels of parallelism by: for each component, dynamically assigning a generated instance to one or more nodes of the host systems; and causing each of the plurality of assigned instances to execute on the one or more nodes of the host systems. In some examples, the given module is a first module, the generated plurality of instances is a plurality of first instances, and the method further includes: determining, by the data processing system, a number of parallel executions of a second module of the first application; for the second module, generating a plurality of second instances of the container image in accordance with the number of parallel executions determined for the second module, with each second instance including the first and second applications; for each second instance, configuring that second instance to execute the second module of the first application; causing each of the plurality of configured, second instances to execute on one or more of the host systems; and causing establishment of a communication channel between one of the first instances and one of the second instances, wherein the one of the first instances outputs data and transmits that output data, over the communication channel to the one of the second instances.

In some examples, the communication between the data processing system and the one or more of the host systems executing that configured instance includes: transmitting, by the given module, monitor data to the second application, and passing, by the second application, the monitor data to the data processing system, wherein the monitor data is configured to be used by the data processing system to track when the given module has completed execution for the data processing system to instruct the another module to execute. In other examples, the given module is a first module, wherein the generated plurality of instances is a plurality of first instances, and wherein the operations further include: determining, by the data processing system, a number of parallel executions of a second module of the first application; for the second module, generating a plurality of second instances of the container image in accordance with the number of parallel executions determined for the second module, with each second instance including the first and second applications; for each second instance, configuring that second instance to execute the second module of the first application; causing each of the plurality of configured, second instances to execute on one or more of the host systems; retrieving, from a local data store, an address of one of the second instances; and in accordance with the retrieved address, providing, from one of the first instances to the one of the second instances, output from the one of the first instance.

Other embodiments of these aspects include corresponding computer systems, apparatus, and computer programs recorded on one or more computer storage devices, each configured to perform the actions of the methods together or in any combination.

Among other advantages, aspects achieve a large amount of flexibility (in terms of identification of resources to modules in host containers) and/or realizes a decrease in computational resources in executing the applications (though launching of the applications from within a container). The techniques described herein contribute to more efficient and/or flexible usage of computational resources of a computing system executing computer programs and therefore enhance and ensure the proper internal functioning of the computing system. Another technical effect of the techniques described herein is the effect on the computer program, such as the data processing graph, being executed on the computing system. Further, a greater number of computer program portions (modules) may be able to execute concurrently, and/or some of the computer program portions may be able to start sooner by not having to wait as long to acquire the necessary computational resources of the computing system needed to execute.

Other features and advantages of the invention will become apparent from the following description, and from the claims.

DESCRIPTION

Figure 1:
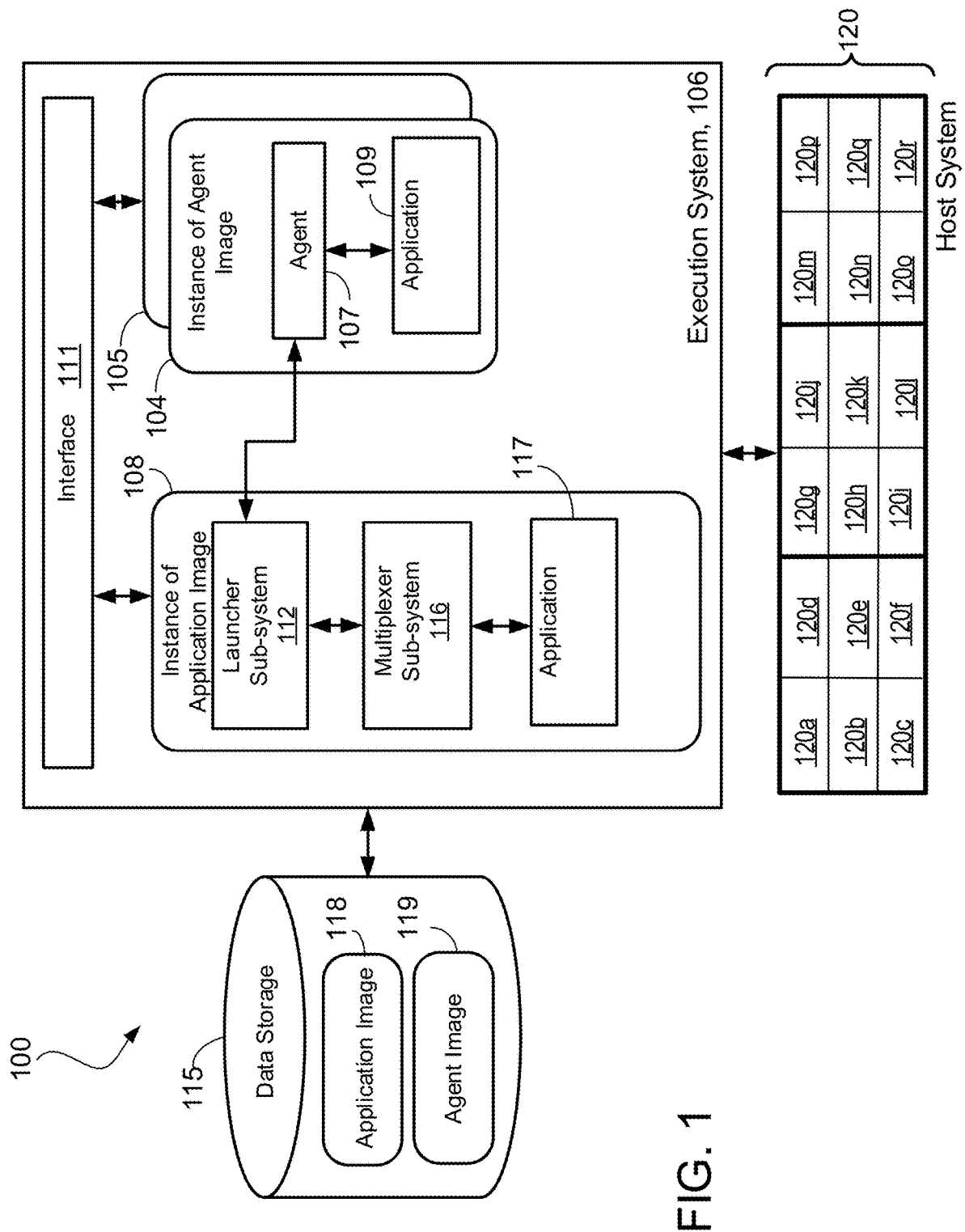
FIGS. 1, 3B, and 4A, 4B are each a block diagram of a system for dynamic distribution of image instances.

Data processing graphs are dynamically run on multiple nodes to obtain dynamic levels of parallelism. These data processing graphs are computationally intensive with large amounts of computing disk input and output (I/O). To reduce disk I/O, these data processing graphs are launched from within containers, which share a kernel with a host operating system (of a system hosting the container). Generally, a container includes a class, a data structure, or an abstract data type (ADT) whose instances are collections of other objects. A container can be implemented as any suitable data structure for containing a particular quantity of computational resources, or containing any information that identifies a particular quantity of computational resources, or any combination thereof. Containers store objects in an organized way that follows specific access rules. Scheduling, networking, disk I/O and access to hardware are provided by the kernel. To utilize the advantages of containers, the system described herein dynamically distributes these containers (including the data processing graphs) across multiple nodes. The distribution is dynamic because which nodes will execute which containers is unknown (e.g., not previously defined or specified) prior to allocation of resources of the nodes for execution of the containers. Through implementation of this dynamic distribution of containers including the data processing graphs, the system achieves a large amount of flexibility (in terms of identification of resources to host the containers) and realizes a decrease in computational resources in executing the data processing graphs (though launching of the graphs from within a container).

Generally, a data processing graph (e.g., a computation graph) will include multiple components, with each component encapsulating executable logic. Each component can be specified to run a certain number of ways parallel, e.g., across multiple, different machines. As such, a first component may be executing on five different machines and a second component may be executing on two different machines. In this example, the first component outputs data to the second component. That is, the first component is upstream from the second component. As described herein, one of the advantages of this system is that the system dynamically generates connections (e.g., communication channels or pipes)—e.g., at run-time—between the first component (included in a container executing on one machine) and the second component (included in another container executing on a different machine). The connections between components do not need to be pre-specified or pre-configured. Using the techniques described herein, the connections can be established dynamically at run-time and on the systems that are hosting the containers. In contrast, prior art systems are not able to dynamically generate these connections. As such, in prior art systems, all of the upstream applications must complete execution before data is transmitted to downstream applications, thus creating latency in the execution of applications. That is, in prior art systems, the applications are run serially—rather than continuously as described here. In particular, using the systems described herein, dataflow graphs (and their attendant components) are executed continuously and in real-time, with reduced latency—as the first components do not need to wait for all of the first components to complete execution to transmit output data to the second components.

Referring to FIG. 1, networked environment 100 is shown in which instances of images are launched with dynamic distribution. Generally, an image includes a file that when executed produces an application run-time environment, which includes an application (e.g., an executable application) and a runtime environment (e.g., system tools, libraries, system binaries and settings) for execution of the application. An instance of an image refers to a particular occurrence of an image. There are various types of application run-time environments, including, e.g., a container. Generally, an application run-time environment uses lightweight operation system level virtualization by sharing a kernel with a host operating system. As such, scheduling, networking, disk input/output and access to hardware are provided by the kernel. Accordingly, application run-time environments have faster start-up times, better resource distribution, direct hardware access and less redundancy than virtual machines. Generally, dynamic distribution (also referred to herein as a dynamic layout) refers to an amount of parallelism implemented in executing an application (or a portion thereof) and that resources required to implement the parallelism are assigned at run-time (i.e., dynamically), as described in US 2018/0165129A1, the entire contents of which are incorporated herein by reference. For example, instances of container images (as described herein) are dynamically assigned to nodes on hosts systems, e.g., by assigned at run-time and the assignments not being pre-determined.

Environment 100 includes execution system 106 and data storage 115. Execution system 106 is a system (e.g., the Kubernetes® system) for automating application deployment, scaling and management. Data storage 115 stores application image 118 and agent image 119. Agent image 119 is a container image—an image of a container. Generally, an image includes a replica of the contents of a storage device. In this example, application image 118 is also a container image. Hereinafter, agent image 119 may be referred to as container image 119, without limitation and for purposes of convenience. Generally, an application image includes an image of an application configured to request the launching of other images and to further instruct those other images how to execute. In this example, application image is also a container image. Agent image 119 includes an image of a container that includes an application (e.g., a data processing graph, as described herein) that is being executed and that is configured to receive instructions from application image 118 on how to execute.

Execution system 106 includes interface 111 for communicating with an external system (e.g., nodes). Execution system 106 also retrieves application image 118 and agent image 119 from data storage 115. Execution system 106 executes application image 118 as instance 108 of application image 118. From agent image 119, execution system 106 launches instances 104, 105 of agent image 119.

Application image 118 (as well as instance 108) includes launcher sub-system 112, multiplexer sub-system 116 and application 117. Each of instances 104, 105 of agent image 119 includes agent service 107 and application 109. Multiplexer sub-system 116 launches instances 104, 105 of agent image 119 by transmitting a request to interface 111. In this example, launcher sub-system 112 requests a number of instances of agent image 119 to be launched. In this example, interface 111 is an application programming interface (API) server. In response, the API server launches instances 104, 105 of agent image 119. Each of instances 104, 105 includes agent service 107 and application 109, which is a same type of application as application 117 (e.g., application 109 may be identical to application 117 and/or application 109 may include the same modules as application 117). Launcher sub-system 112 communicates with agent service 107 to instruct agent service 107 on which portions of application 109 are executed by a particular instance of agent image 119. In turn, agent service 107 instructs application 109 on which portions (or components) to execute.

Application 117 is a data processing graph (to give one example of a computer program) that includes vertices (representing data processing components (e.g., executable components) or datasets) connected by directed links (representing flows of work elements, i.e., data) between the vertices. In addition to these data flow connections, some data processing graphs also have control flow connections for determining flow of control (e.g., control flow) among components. In such data processing graphs, the program portions are the components and they are interrelated according to their data flow links. In other examples, the program portions are sub-modules or other entities within a program that are separately granted computing resources for being executed. The program portions are considered interrelated to the extent that the ability of the overall program to which they belong to be executed depends on the abilities of the individual program portions. Such interrelated or interdependent program portions may also be dependent on each other for execution. For example, one program portion may receive data from or provide data to another program portion. Also, while the program portions are separately granted computing resources, they may overlap or be interdependent in various other ways (e.g., competing for a limited supply of computing resources).

For example, such an environment for developing graph-based computations is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Data processing graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

Instance 108 of application image 118 includes application 117 (which is the same as application 109) to enable launcher sub-system 112 to identify the various components or portions of application 117 and how they communicate with each other, to enable instance 108 to instruct instances 104, 105 on how to communicate with each other (e.g., when one component executed by instance 105 requires as input data that is output by a component executed by instance 104). In this example, host system 120 is configured for communication with execution system 106, e.g., such that execution system 106 can launch instances 104, 105 of container image 119 on one or more of nodes 120a-120r. In this example, host system 120 is a Kubernetes® systems that hosts and runs (e.g., executes) instances of container image 119.

Figure 2A:
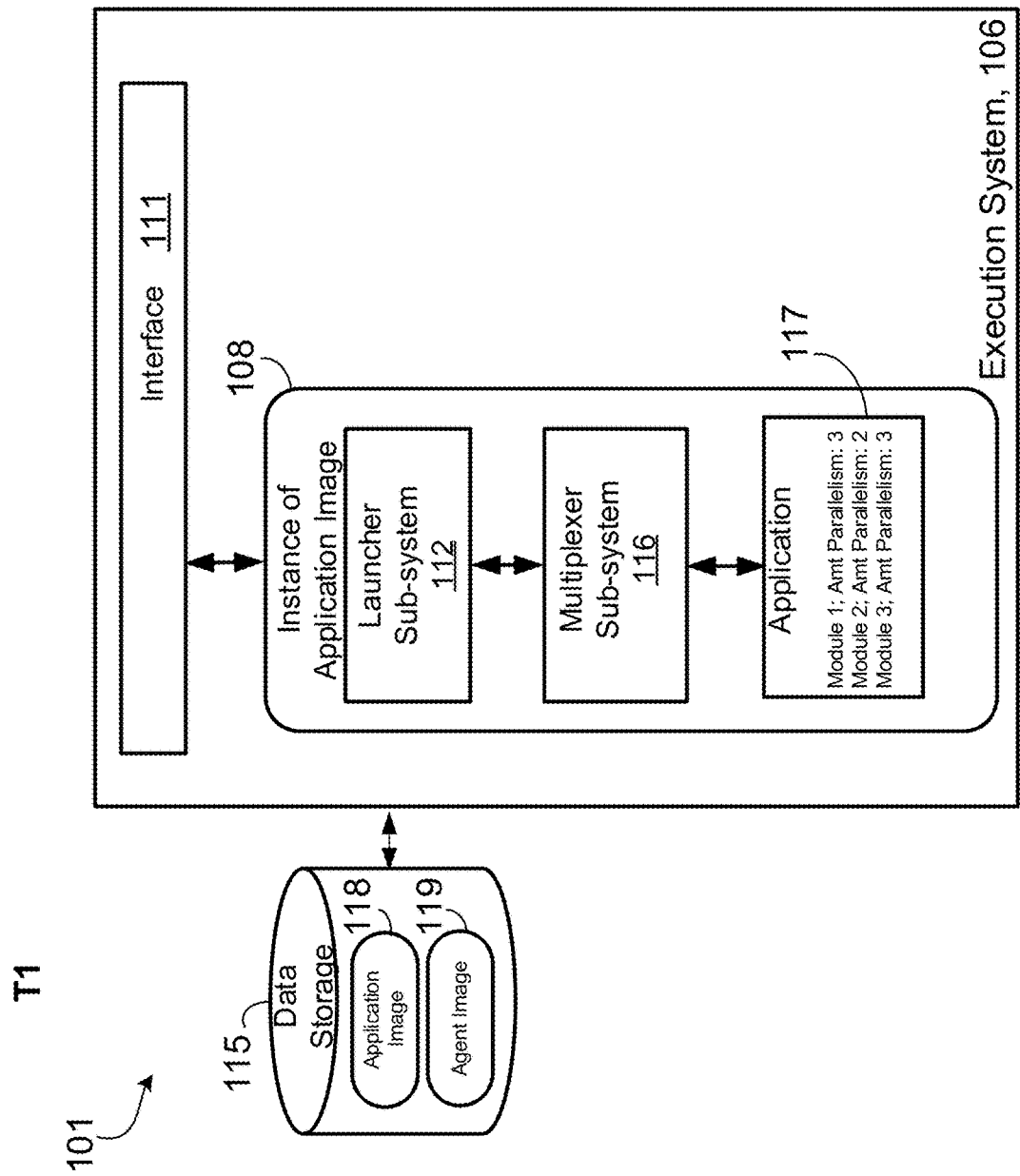
FIGS. 2A-2F illustrate a time series of dynamic distribution of container images.
Figure 2B:
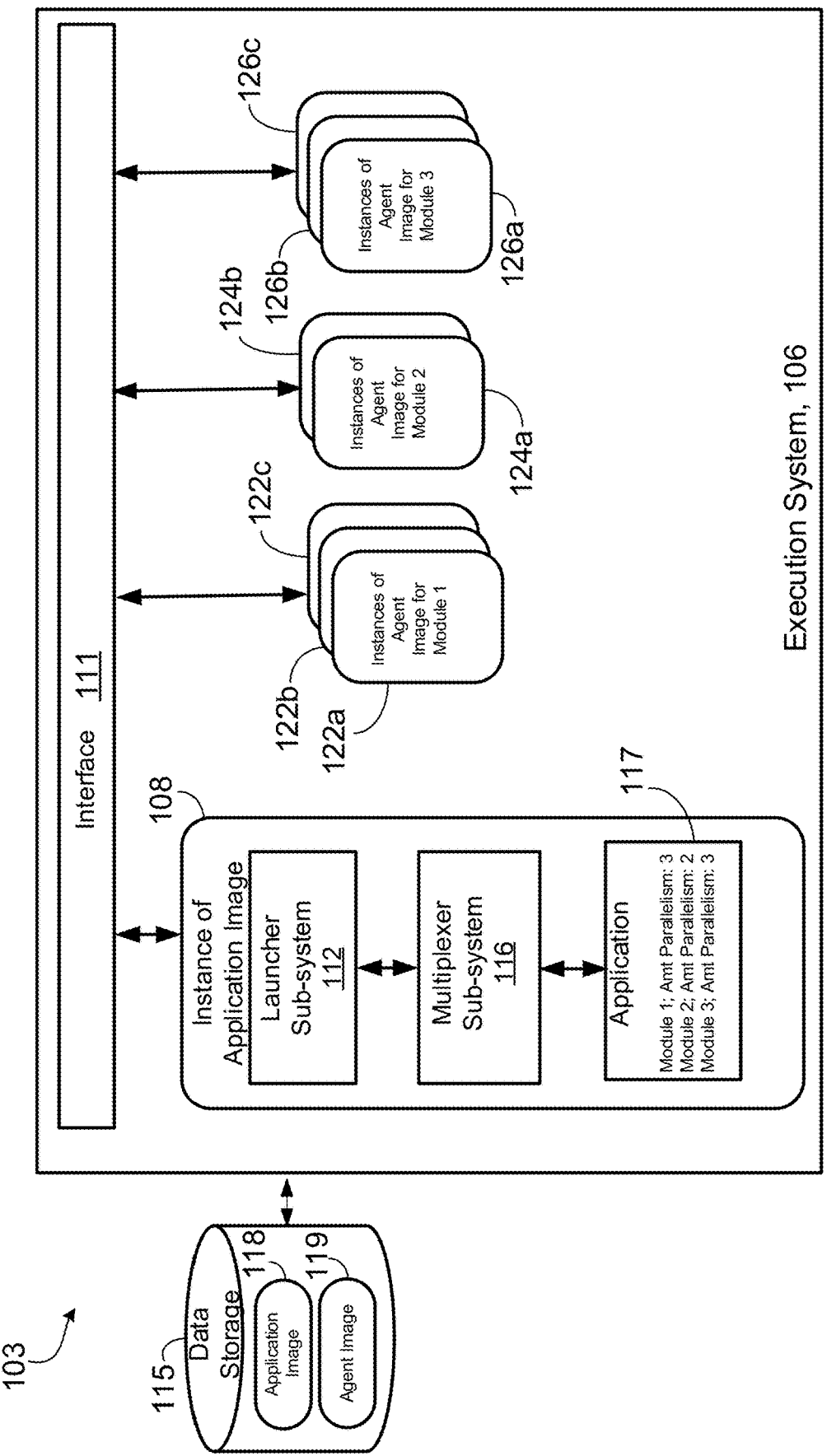

Referring to FIGS. 2A-2F, a time series of dynamic distribution of instances of container images is shown. Referring to FIG. 2A, environment 101 is an example of environment 100 (FIG. 1) at a first time ("T1"). At time T1, execution system 106 retrieves, from data storage 115, instance 108 of application image 118. As previously described, application image 118 is a container image that includes launcher sub-system, multiplexer sub-system and application 117. Application 117 is a program with three modules, modules 1-3. Each module specifies an amount of parallelism to be implemented in that module. In this example, application 117 includes a specification that specifies a number of parallel executions of a given module and that specification is accessed, e.g., by launcher sub-system 112 in performing the configuration. Generally, an amount of parallelism refers to a number of times a particular module executes, e.g., at a same time, simultaneously, etc. Module 1 is configured to execute three times in parallel. Module 2 is configured to execute twice in parallel. Module 3 is configured to execute three times in parallel. Referring to FIG. 2B, environment 103 is shown. Environment 103 is a version of environment 101 (FIG. 1) at a second time ("T2"). In this example, launcher sub-system 112 communicates to multiplexer sub-system a number of instances of the container image to be launched for each module—in accordance with the specified amounts of parallelism. Launcher sub-system 112 instructs multiplexer sub-system 116 to launch three instances 122a-122c of container image 119 and to configure those instances 122a-122c to execute module one. Because the amount of parallelism for module one is configured to be three, launcher sub-system 112 instructs multiplexer sub-system 116 to launch three instances 122a-122c of container image 119. In response, multiplexer sub-system 116 requests that interface 111 launches instances 122a-122c and interface 111 launches instances 122a-122c.

Launcher sub-system 112 instructs multiplexer sub-system 116 to launch three instances 124a-124b of container image 119 and to configure those instances 124a-124b to execute module two. Because the amount of parallelism for module two is configured to be two, launcher sub-system 112 instructs multiplexer sub-system 116 to launch two instances 124a-124b of container image 119, with each of instances 124a-124b being configured to execute module two. In response, multiplexer sub-system 116 requests that interface 111 launches instances 124a-124b and interface 111 launches instances 124a-124b in execution system 106.

Launcher sub-system 112 instructs multiplexer sub-system 116 to launch three instances 126a-126c of container image 119 and to configure those instances 126a-126c to execute module one. Because the amount of parallelism for module one is configured to be three, launcher sub-system 112 instructs multiplexer sub-system 116 to launch three instances 126a-126c of container image 119. In response, multiplexer sub-system 116 requests that interface 111 launches instances 126a-126c and interface 111 launches instances 126a-126c.

Figure 2C:
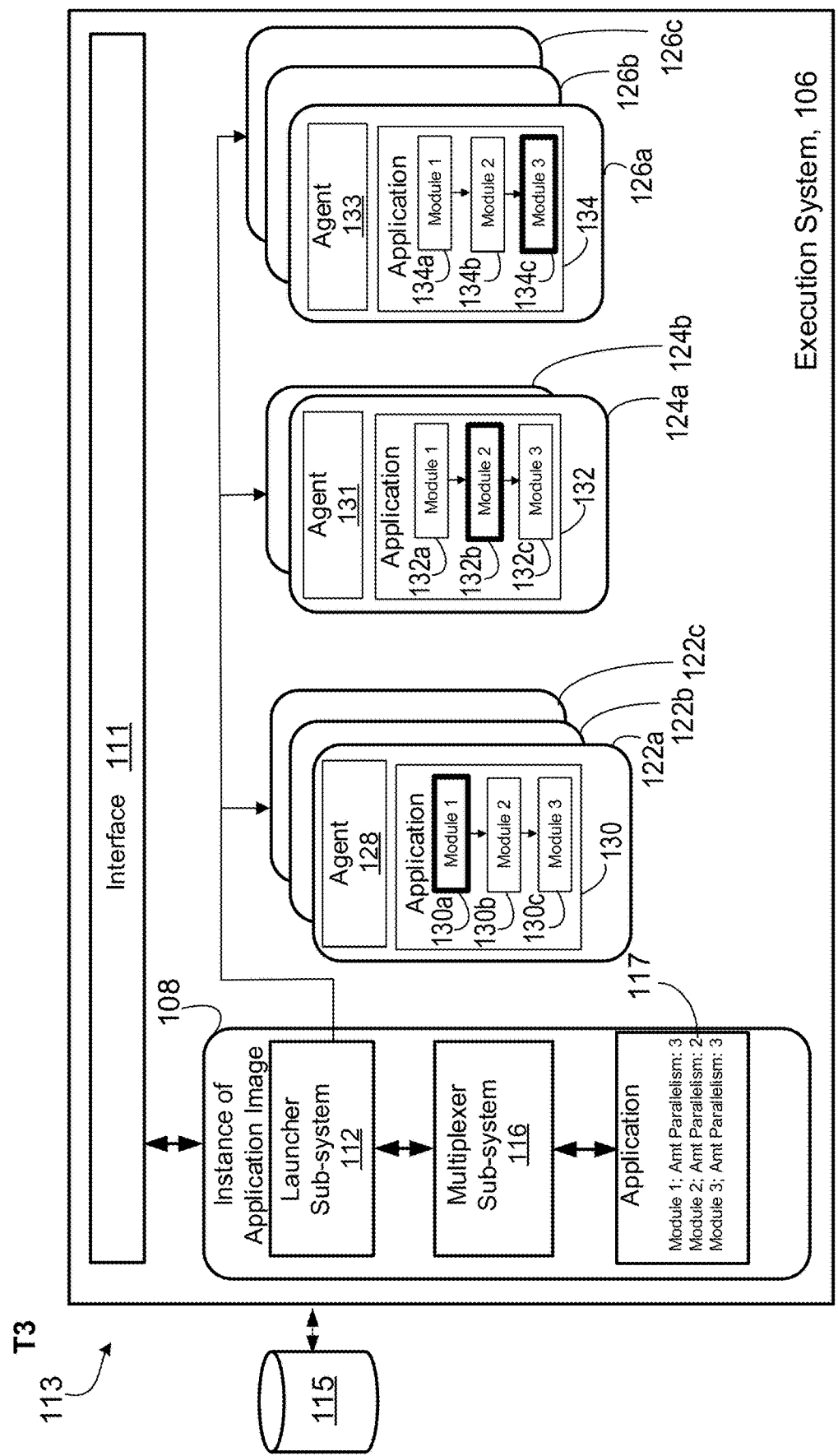

Referring to FIG. 2C, environment 113 is shown. Environment 113 is a version of environment 100 (FIG. 1) at a third point in time (T3). At time T3, launcher sub-system 112 configures instances 122a, 122b, 122c of container image 119 (FIG. 1). Each of instances 122a, 122b, 122c includes an agent service and an application with the three modules. Instance 122a includes agent service 128 and application 130, with modules 130a-130c. Each of applications 130, 132, 134 may be identical to application 117 and/or each of applications 130, 132, 134 may include the same modules as application 117. Launcher sub-system 112 configures each of instances 122a, 122b, 122c of container image 119 to execute module one (e.g., module 130a in application 130), e.g., by transmitting instructions to each of instances 122a-122c on which module that instance should execute. In this example, launcher sub-system 112 identifies an amount of parallelism for each module by looking-up the specified amount of parallelism in application 117.

Launcher sub-system 112 configures instances 124a, 124b of container image 119 (FIG. 1). Each of instances 124a, 124b includes an agent service and an application with the three modules. Instance 124a includes agent service 131 and application 132, with modules 132a-132c. Launcher sub-system 112 configures each of instances 124a, 124b of container image 119 to execute module two (e.g., module 132b in application 132), e.g., by transmitting instructions to each of instances 124a-124b on which module that instance should execute.

Launcher sub-system 112 configures instances 126a, 126b, 126c of container image 119 (FIG. 1). Each of instances 126a, 126b, 126c includes an agent service and an application with the three modules. Instance 126a include agent service 133 and application 134, with modules 134a-134c. Launcher sub-system 112 configures each of instances 126a, 126b, 126c of container image 119 to execute module three (e.g., module 134c in application 134), e.g., by transmitting instructions to each of instances 126a-126c on which module that instance should execute.

Figure 2D:
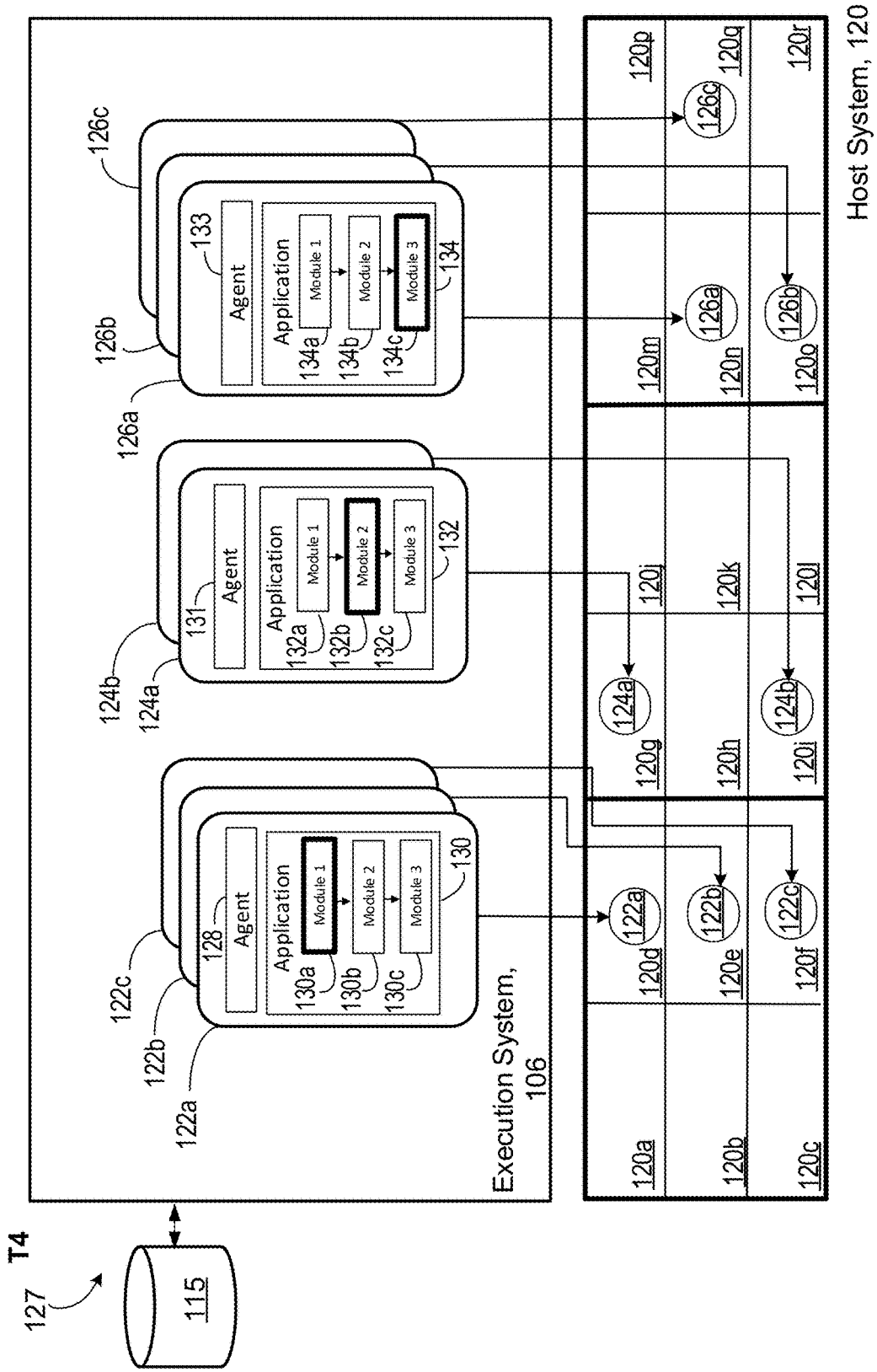

Referring to FIG. 2D, environment 127 is shown. Environment 127 is an example of environment 100 (FIG. 1) at a fourth point in time (T4). At time T4, execution system 106 transmits or assigns instances of the container image to host system 120 for execution on host system. In this example, instance 122a is assigned to node 120d. Upon receipt of instance 122a, node 120d hosts and executes instance 122a of container image 119 (FIG. 1), thereby instantiating the container. Instance 122b is assigned to node 120e. Upon receipt of instance 122b, node 120e hosts and executes instance 122b of container image 119 (FIG. 1). Similarly, instances 122c, 124a, 124b, 126a, 126b, 126c are assigned to nodes 120f, 120g, 120i, 120n, 120o and 120q, respectively. Upon receipt of instances 122a, 124a, 124b, 126a, 126b, 126c, nodes 120f, 120g, 120i, 120n, 120o and 120q host and execute (on host system 120) respective instances of container image 119 (FIG. 1).

Figure 2E:
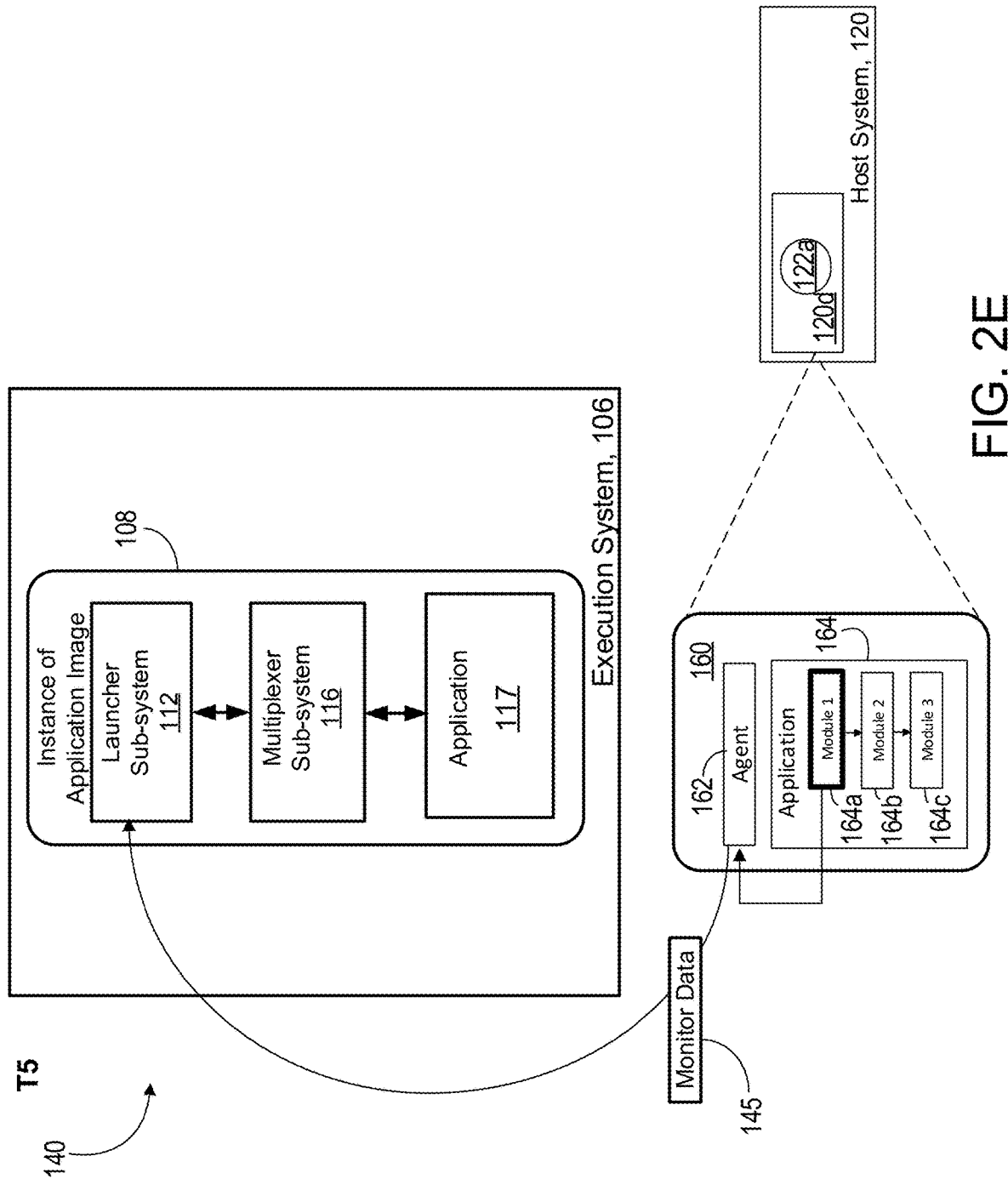

Referring to FIG. 2E, environment 140 is shown. Environment 140 is a version of environment 100 (FIG. 1) at a fifth point in time (T5). At time T5, container image 122a is instantiated on node 120d as container 160. Generally, a container image is instantiated as a container when a command included in a program or application running on a node (or other computing system) takes the container image as a template and produces a container from it, which is then executed on the node.

The instantiation of container image 122a produces container 160 with agent service 162, which corresponds (e.g., is identical to) to agent service 128 included in container image 122a. In some examples, agent service 128 is an agent service image (i.e., an image of an agent service). In this example, agent service 162 is instantiated from the agent service image when container image 122a is instantiated. The instantiation of container image 122a also produces application 164 (included in container 160). In this example, application 164 includes modules 164a, 164b, 164c. Application 164 corresponds to application 130 included in container image 122a. In some examples, application 130 is an application image (i.e., an image of an application). In this example, application 164 is instantiated from the application image when container image 122a is instantiated.

During execution of container 160, application 164 passes monitor data 145 back to launcher sub-system 112, e.g., to enable launcher sub-system to track a progress of application 164 and to track errors that may occur in application 164. In particular, module 164a is configured to transmit monitor data 145 to agent service 162, which in turn communicates with launcher sub-system 112 and passes the monitor data 145 back launcher sub-system 112. Monitor data 145 is used by launcher sub-system 112 to also track when a particular module (e.g., 164a) has completed execution, e.g., so that launcher sub-system 112 can instruct the next module to execute (e.g., the next module on the same node or a next module on a different node).

Figure 2F:
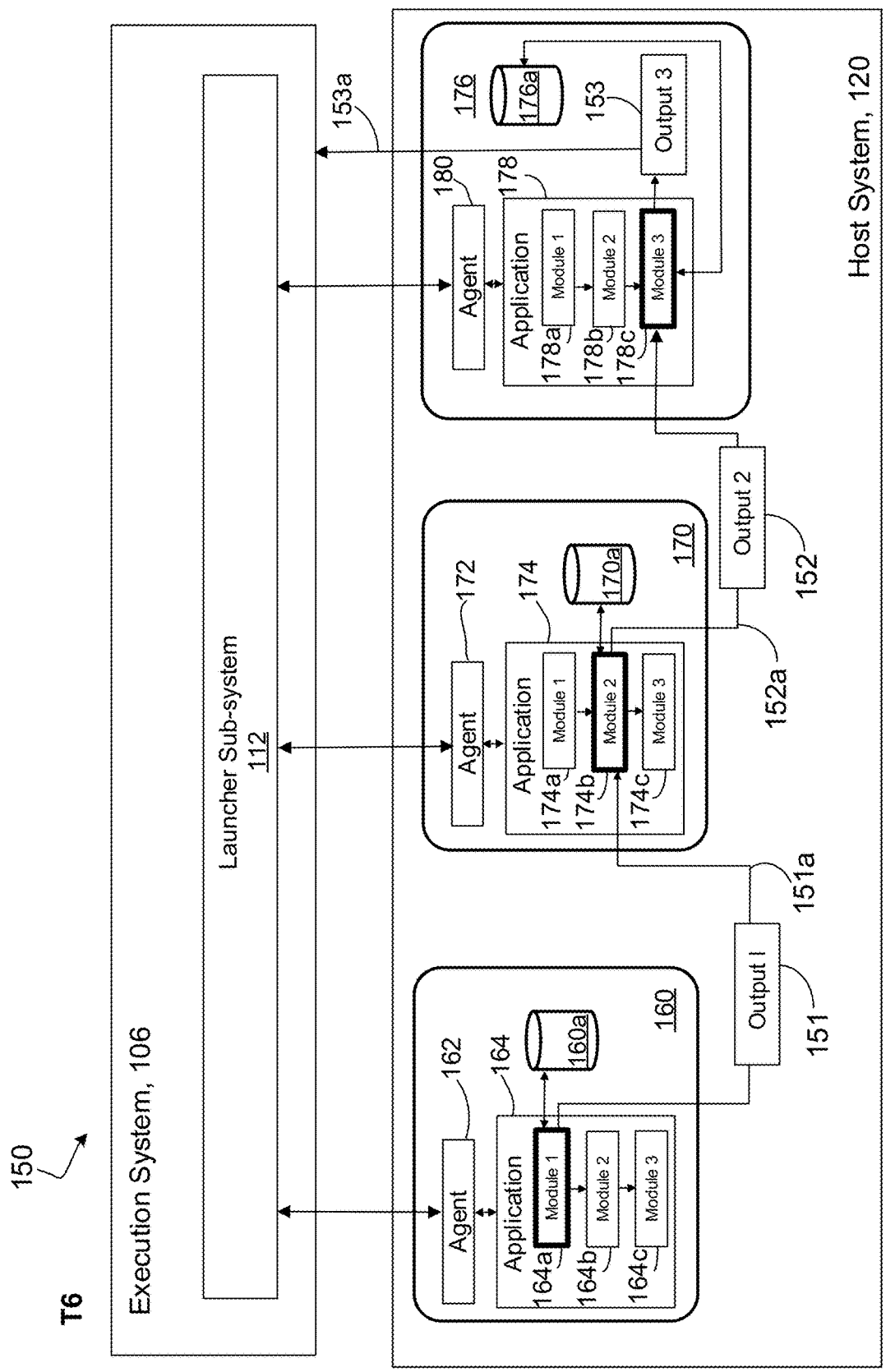

Referring to FIG. 2F, environment 150 is shown. Environment 150 is a version of environment 100 (FIG. 1) at a six point in time (T6). Environment 150 illustrates internode communication among containers 160, 170, 176 (executing on host system and instantiated from container images 122a, 124a, 126a, respectively).

In this example, container 170 includes agent service 172 and application 174 (with modules 174a, 174b, 174c). In this example, application 174 is configured to execute module 174b, in accordance with the configuration of container image 124a, from which container 170 is instantiated.

In this example, container 176 includes agent service 180 and application 178 (with modules 178a, 178b, 178c). In this example, application 178 is configured to execute module 178c, in accordance with the configuration of container image 126a, from which container 176 is instantiated. In this example, container 160 executes on node 120d (FIG. 2D), which is the node to which container image 122a is assigned. Container 172 executes on node 120g (FIG. 2D), which is the node to which container image 124a is assigned. Container 176 executes on node 120n (FIG. 2D), which is the node to which container image 126a is assigned.

In this example, a complete application is executed by the various modules of the application communicating with each other and passing the output of one module to the input of another module, thereby enabling an entire application to execute across multiple machines. In this example, each module in applications 164, 174, 178 is configured to communicate with other modules (e.g., running on different nodes) or with the execution system 106.

In this example, container 160 is configured to execute module 164a to generate output 151 and to transmit output 151 to module 174b of container 170. In turn, container 170 is configured such that when module 174b executes that the output 152 of module 174 is input to module 178c of application 178 on container 176. In turn, container 176 is configured to execute module 178c to generate output 153 and to transmit that output back to execution system 106, e.g., to enable execution system to monitor which modules have executed and which modules have completed execution. In this example, each of agent services 162, 172, 174 are configured to communication with launcher sub-system 112, e.g., to transmit monitor data back to launcher sub-system to enable launcher sub-system 112 to track the progress of container execution.

In this example, containers 160, 170, 176 are able to automatically generate connections (e.g., pipes or communication channels) amongst each other. In this example, container 160 includes a local data store 160a, which includes an address for the output of module 164a. In this example, data store 160a stores the address of module 174b on container 170. During the assignment of containers to nodes, host system 120 communicates to execution system 106 the addresses of nodes to which instances are assigned. In turn, launcher sub-system 112 (or execution system 106 more generally) identifies which modules needs to transmit information to other modules, e.g., based on contents of application 117. That is, launch sub-system identifies upstream modules and downstream modules. Using the received address information, launch sub-system 112 transmits to the local data stores the address of the module to which output data is transmitted.

In this example, containers 160, 170, 176 includes local data stores 160a, 170a, 176a, respectively. Launcher sub-system 112 transmits to local data store 160a the address of module 174b, transmits to local data store 170a the address of module 178c and transmits to local data store 176a instructions to transmit output data back to execution system 106.

Upon completion of execution, module 164a looks up in local data store 160a the address of the data structure to output the output of module 164a. The looked up address specifies module 174b. Using this address, module 164a transmits output 151 to module 174b over link 151a. In some examples, module 164a sets up link 151a, e.g., by establishing a communication channel to module 174b. By dynamically setting-up link 151a once module 164a has finished execution, there is reduced latency in starting execution of module 174b.

Upon completion of execution, module 174b looks up in local data store 170a the address of the data structure to output the output of module 174b. The looked up address specifies module 178c. Using this address, module 174b transmits output 152 to module 178c over link 152a. In some examples, module 174b sets up link 152a, e.g., by establishing a communication channel to module 178c. By dynamically setting-up link 152a once module 174b has finished execution, there is reduced latency in starting execution of module 178c.

Upon completion of execution, module 178c looks up in local data store 176a the address of the data structure to output the output of module 178c. The looked up address specifies execution system 106. Using this address, module 178c transmits output 153 to execution system 106 over link 153a. In some examples, module 178c sets up link 153a, e.g., by establishing a communication channel to execution system.

In this example, module 164a is able to look-up, e.g., at start-up time of module 164a, an address—from data store 160a—for output 151. In another example, module 164a looks-up this address as it is processing data. Based on these look-ups, modules 164a, 174b, 178c are able to stream data around, e.g., continuously and in real-time—without having to land the data to disk. In prior art systems, the data has to be landed to disk in order for the data to be re-partitioned. In contrast, the system described herein is able to re-partition data in real-time and continuously, without landing it to disk, by being able to look-up the address of an output node.

Figure 3A:
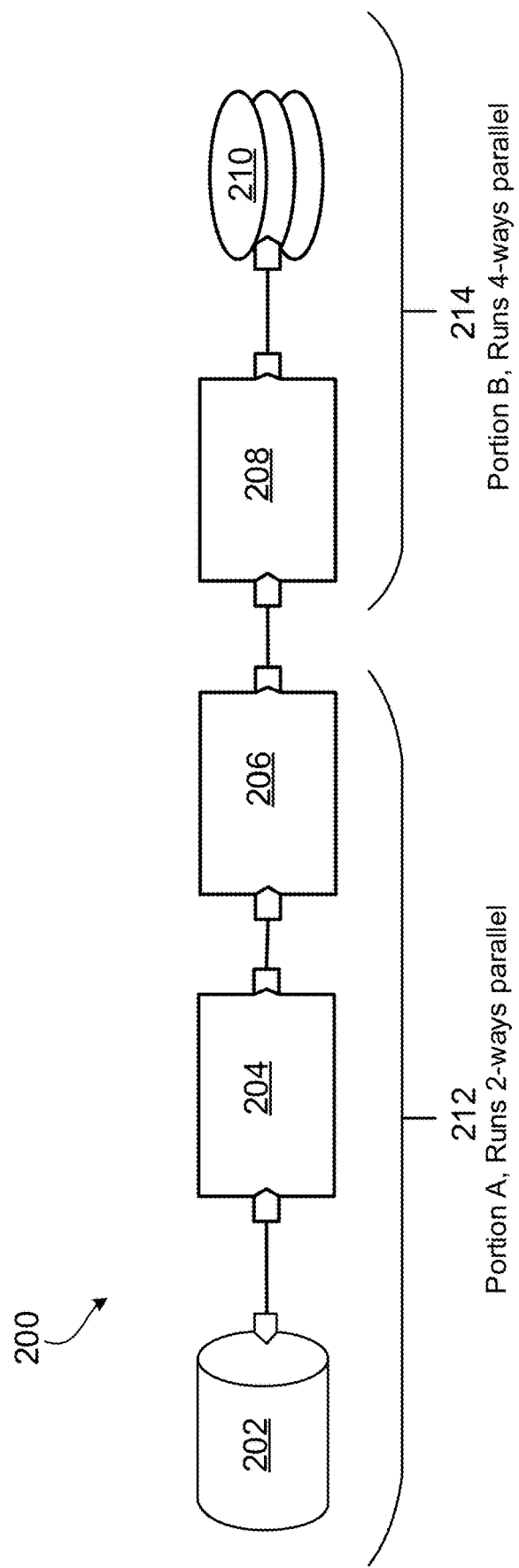
FIG. 3A is a diagram of a data processing graph.

Referring to FIG. 3A, data processing graph 200 includes components 202-210. Data processing graph 200 also includes portions or groupings of components. Data processing graph 200 includes portion 212 and portion 214. Portion 212 includes components 202-206. Portion 214 includes components 208, 210. Portion 212 runs two ways parallel and portion 214 runs four ways parallel.

Figure 3B:
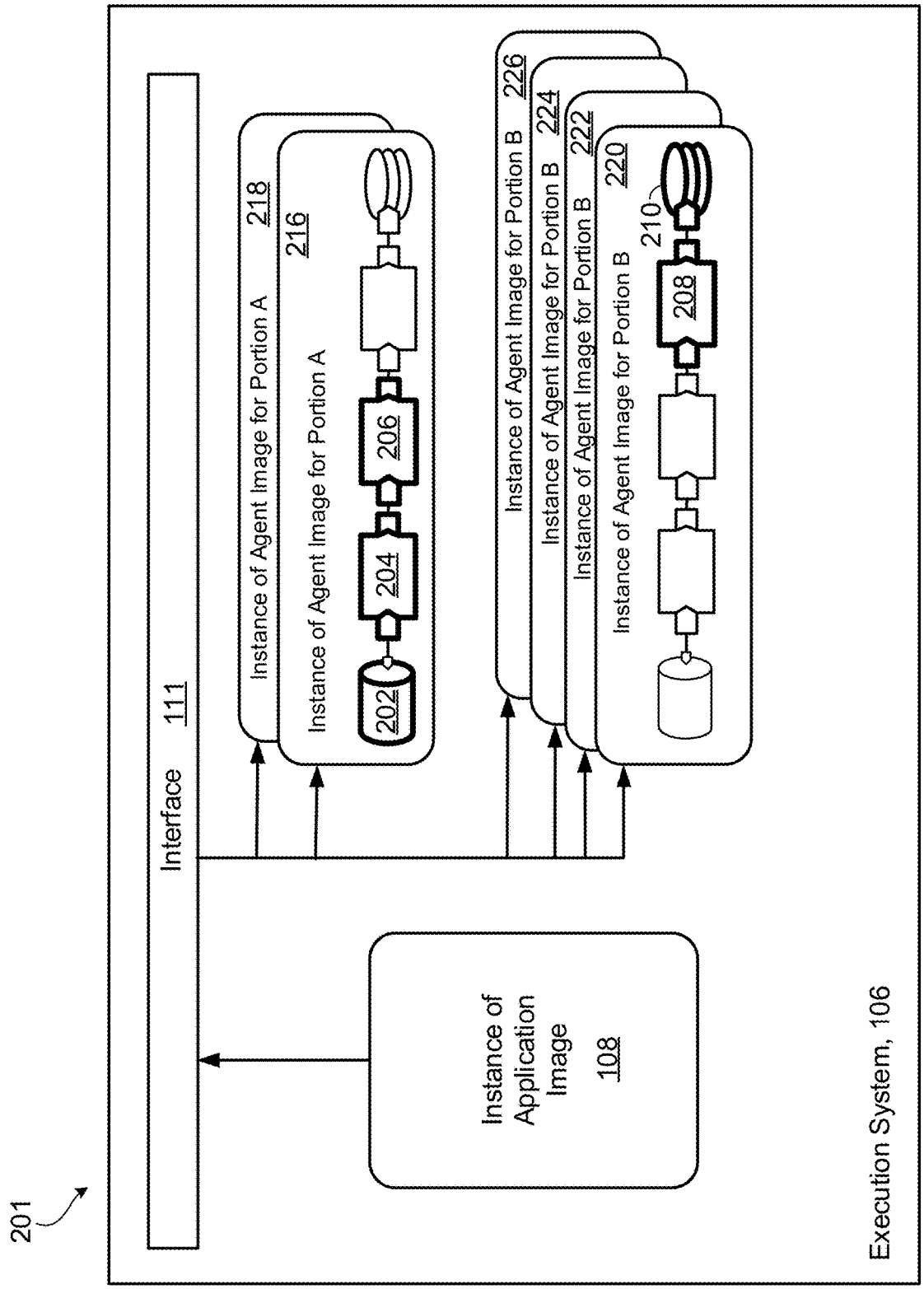

Referring to FIG. 3B, diagram 201 illustrates parallel execution of portions 212, 214 (FIG. 3A). Instance 108 of application image 118 (FIG. 1) launches two instances 216, 218 of agent image 119 (FIG. 1) to execute portion 212 (FIG. 3A), which runs two ways parallel. Each of instances 216, 218 is instructed by a launcher sub-system to execute components 202, 204, 206. Instance 108 of application image 118 (FIG. 1) launches four instances 220-226 of agent image 119 (FIG. 1) to execute portion 214 (FIG. 3A), which runs four ways parallel. Each of instances 220-226 is instructed by a launcher sub-system to execute components 208, 210.

Computation Resource Allocation

Figure 4A:
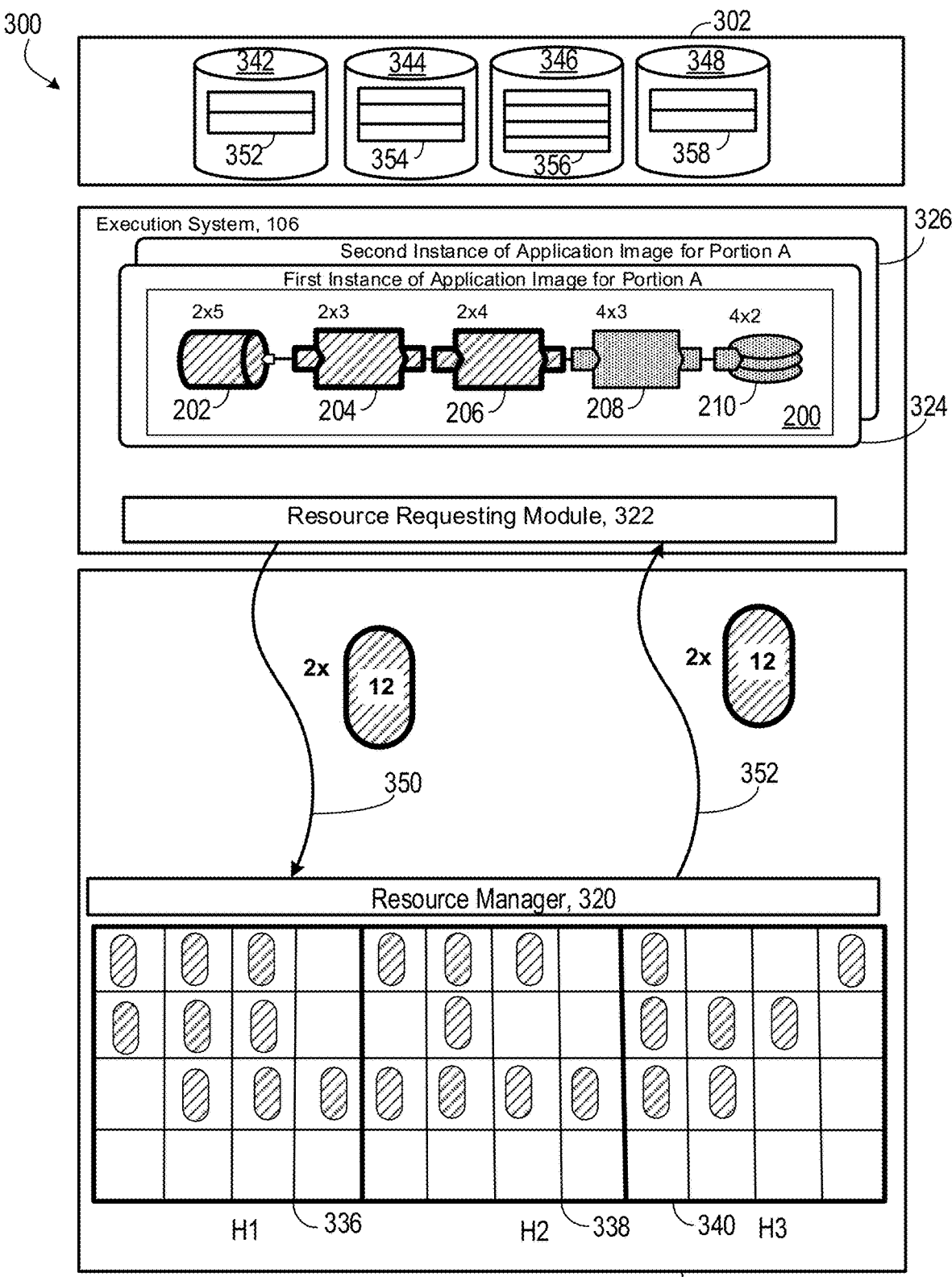

Referring to FIG. 4A, environment 300 includes execution system 106, data source 302, and host cluster 306 for processing data from data source 302 using computational resources of host cluster 306, which includes computational resources which may be distributed across multiple hosts (e.g., computing clusters such as servers). In FIG. 4A, there are three hosts: a first host, H1 336, a second host, H2 338, and a third host, H3 340. Each host includes a finite amount of computational resources which taken together include the total computational resources of host cluster 306. Examples of the computational resources being managed and allocated by execution system 106 may include any of: a usage share of a host's processor (e.g., specified as virtual cores that map to physical cores of one or more multi-core processors), a portion of volatile memory of a host (e.g., specified a quantity of the host's main memory space), a portion of non-volatile memory of a host (e.g., specified as a quantity of the host's hard disk drive storage space), or a usage share of a communication channel (e.g., a fraction of the bandwidth of a host's Ethernet interface). A single unit of computational resources may include multiple types of resources, such as a specified number of CPUs or virtual cores and a specified amount of main memory.

Execution system 106 includes resource requesting module 322. Host cluster 306 includes resource manager 320. Resource requesting module 322 interacts with resource manager 320 to allocate computational resources to the components such that no one component is allocated more computational resources than it needs while another component is starved of computational resources.

For the sake of simplifying the explanation of the computational resource allocation approaches described herein, the computational resources of the hosts are represented as computational resource units (illustrated as squares within the hosts), which are all shown as having the same granularity (i.e., the smallest size that can be granted). However, it is noted that the computational resources are not necessarily segmented into units with a fixed and equal granularity but can instead be segmented into units of various granularities or portioned using other, alternative approaches. Furthermore, for the sake of simplifying the explanation of the computational resource allocation approaches described herein, all of the hosts in host cluster 306 of FIG. 4A are shown as having the same number (i.e., 16) of computational resource units. However, it is noted that, in general, different hosts may have different amounts of computational resources.

Resource manager 320 receives requests for computational resources and either grants or denies the requests based on an amount of available computational resources in the hosts of host cluster 306. One example of such a resource manager 320 includes the "Hadoop YARN" resource manager which is capable of receiving a request for computational resources for executing a computer program (or program portion) and, if sufficient computational resources are available, grants a 'workspace' with some number of units of the computational resources for use by the program, where a workspace can be implemented as any suitable data structure for containing a particular quantity of computational resources, or containing any information that identifies a particular quantity of computational resources, or any combination thereof. The computer program may then execute using the computational resources in the granted workspace. In some examples, the computer program can request multiple workspaces of resources at one time (e.g., a number of workspaces for running concurrent instances of a portion of the program) from host cluster 306. If sufficient resources are available for resource manager 320 to grant all of the requested multiple workspaces to the computer program, it will do so. Otherwise, based on the available resources, resource manager 320 may grant only some of the requested workspaces (i.e., an integer number of workspaces less than the total number of workspaces requested), or resource manager 320 may not grant any of the requested workspaces. In some implementations, all of the computational resources associated with a given workspace are derived from a single host. Alternatively, in other implementations, a given workspace's resources may be derived from multiple hosts.

As is described in greater detail below, resource requesting module 322 interacts with resource manager 320 in a way that ensures that a number of constraints imposed by data processing graph 200 are satisfied, and/or are satisfied in a more balanced manner.

As previously described, data processing graph 200 is a specification of a computer program for processing data received from data source 302. Data processing graph 200 includes a number of interrelated components including a first component 202, a second component 204, a third component 206, a fourth component 208, and a fifth component 210.

In general, each component of a data processing graph may be associated with one or more constraints. Such constraints may be provided by a 'layout' that specifies constraints related to parallelization of the component. One of the constraints specified in the layout is a 'layout type,' which can take one of a number of values including a fixed-depth dynamic layout (FDL) type. The different layout types specify constraints related to the number of instances of a component that are to execute in parallel when the component is executed. Each of these component instances will consume computational resources, so the target quantity of computational resources needed for a component with a particular layout is directly determined by the corresponding target number of component instances for that component.

A dynamic layout type (FDL) may assign an instance to execute on a different host from the host that stores data to be operated on by that instance, which may provide increased flexibility, but only by trading off reduced locality. Though, if locality is not critical to a particular computation, this trade-off may be worthwhile.

A component with a FDL type has a predefined, fixed target number of component instances that are required to execute on host cluster 306 for data processing graph 200 to successfully run. There is no restriction as to where (i.e., on which hosts of host cluster 306) the component instances of a component with an FDL type execute.

A potential advantage of the dynamic layout type (e.g., FDL) is the flexibility of a computation being able to start even if there are no computational resources available on a particular (e.g., local) host, as long as there are computational resources available on some host in a cluster. Another potential advantage is, if a computation fails due to failure of one or more hosts, the computation may be able to restart on a different set of hosts.

Another potential advantage of the FDL type is the ability to fix the degree of parallelism (i.e., number of instances) in order to limit the startup time delay that would be incurred by waiting for requests for a larger degree of parallelism to be fulfilled.

Figure 4B:
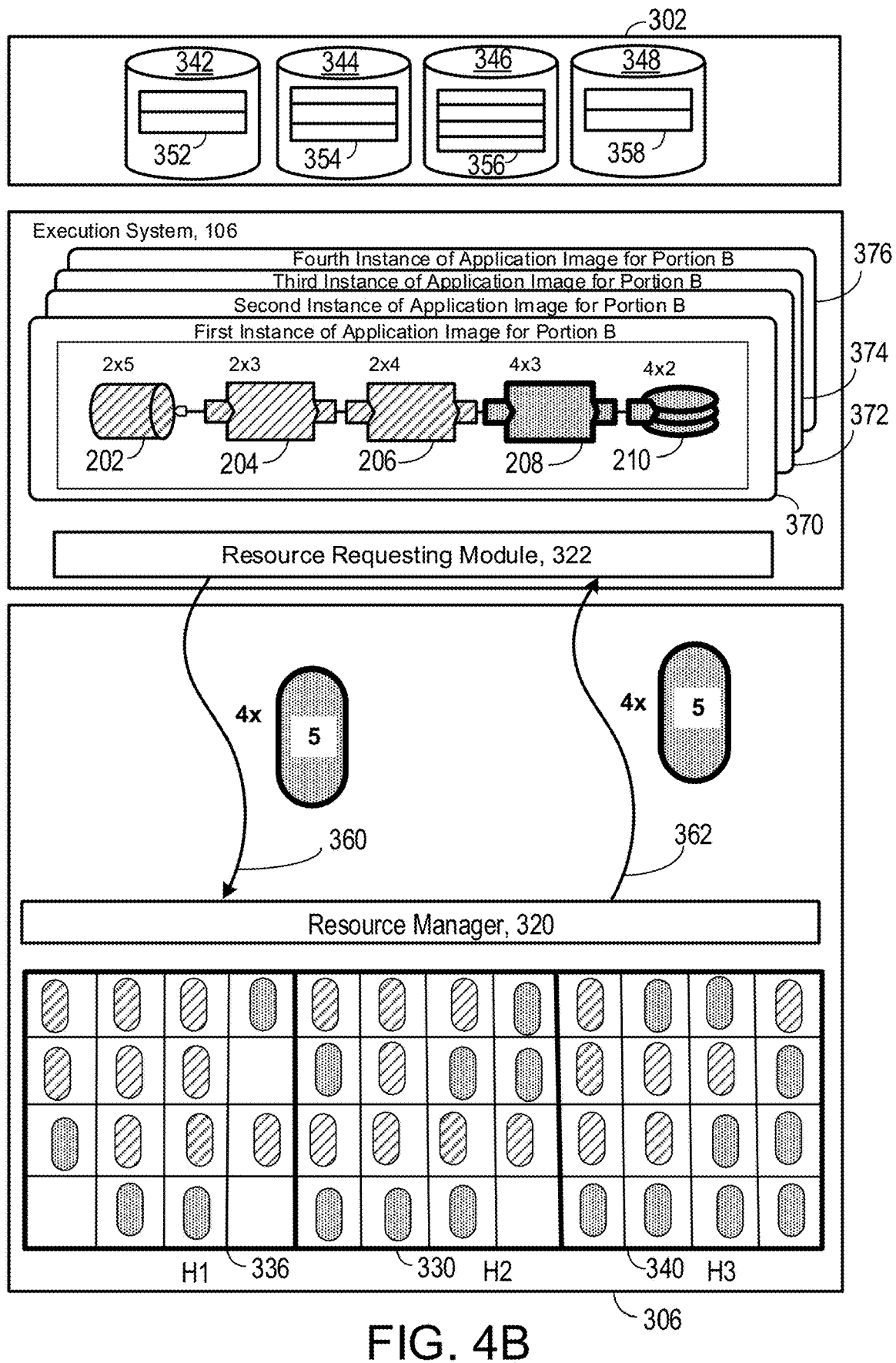

In the exemplary data processing graph 200 if FIG. 4A, each of components 202-210 has a FDL type. Components 202-206 are each required to run two component instances on host cluster 306 with no restriction as to where (i.e., on which hosts of host cluster 306) the component instances are run. Each of components 208, 210 is required to run four component instances on host cluster 306 with no restriction as to where (i.e., on which hosts of host cluster 306) the component instances are run. As described herein, a first portion of data processing graph 200 includes components 202-206 and this first portion is run two ways parallel, thus requiring components 202-206 to be run in two instances 324, 326. In this example, instances 324, 326 (of agent image in FIG. 1) are launched by instance 108 (FIG. 1) of application image 118 (FIG. 1). Two instances 324, 326 are launched for portion 212 (FIG. 3A) since portion 212 (FIG. 3A) is required to be run two ways parallel. Each of instances 324, 326 only executes components 202-206. A second portion of data processing graph 200 includes components 208, 210 and this second portion is run four ways parallel, thus requiring components 208, 210 to be run in four instances 370-376 (as shown in FIG. 4B).

Each of the components in data processing graph 200 is configured to process data elements (e.g., blocks, files, or records) from datasets in data source 302. In some examples, a block is a portion of data in a file that includes one or more records. In FIGS. 3A, 3B, the first component 202 processes first data elements 352 from a first dataset 342, the second component 204 processes second data elements 354 from a second dataset 344, the third component 206 processes third data elements 356 from a third dataset 346, and the fourth component 208 processes fourth data elements 358 from a fourth dataset 348. In an example described below, a portion of execution system 106 analyzes the datasets associated with each component to determine a target number of instances for different components, and consequently a target quantity of computational resources, based on the number of data elements. But, in other examples, the target quantity of computational resources is not solely based on a quantity of data in an associated dataset, but may instead (or also) depend on other factors, such as explicit or implicit user requirements, historical or estimated performance data, or combinations thereof. It is noted that there is no requirement that each component is associated with a different dataset. For example, a number of components may all process data from one or more of the same dataset(s).

Resource Allocation

Given the layout constraints associated with the components in data processing graph 200, data processing graph 200 can only successfully run if two instances of each of components 202-206 are executed on host cluster 306 and four instances of each of components 208-210 are executed on host cluster 306.

If resource requesting module 322 has knowledge of the resources required by a total number of instances of the components of data processing graph 200 and the resources available in host cluster 306, then the task of allocating the computational resources for data processing graph 200 via the resource manager 320 could be performed using a solution to a packing optimization problem. However, it is generally not the case that resource requesting module 322 has knowledge of the resources available in host cluster 306. Instead, resource requesting module 322 simply requests resources from resource manager 320 and waits to see if the requested resources are granted.

Referring to FIGS. 4A-4B, execution system 106 prepares for executing data processing graph 200. Resource requesting module 322 analyzes the portions and components of data processing graph 200 to determine the resource requirements for each of the components. Resource requesting module 322 determines that the each instance of the first component 202 requires five units of computational resources, each instance of the second component 204 requires three units of computational resources, each instance of the third component 206 requires four units of computational resources, each instance of the fourth component 208 requires five units of computational resources, and each instance of the fifth component 210 requires two units of computational resources.

Referring to FIG. 4A, resource requesting module 322 interacts with resource manager 320 to allocate resources for instances 324, 326 of the first portion of data processing graph 200, where the first portion includes components 202, 204, 206. To do so, resource requesting module 322 sends a request 350 to resource manager 320 for two workspaces (i.e., one for each required instance of the portion that includes components 202, 204, 206) from hosts 336, 338, 340, each with a size of twelve computational resource units. Resource manager 320 allocates nine computational resource units on the first host 336, eight computational resource units on the second host 338 and seven computational resource units on the third host 340. Resource manager 320 responds with message 352 indicating that it was able to allocate the requested computational resources and request 350 is therefore fulfilled. With two workspaces, each including twelve computational resource units allocated for the first, second and third components 202, 204, 206, the first second and third components 202, 204, 206 are 100% fulfilled, as is required for data processing graph 200 to execute.

Referring to FIG. 4B, resource requesting module 322 interacts with resource manager 320 to allocate resources for instances 370, 372, 374, 376 of the second portion (which includes components 208, 210) of data processing graph 200. To do so, resource requesting module 322 sends request 360 to resource manager 320 for four workspaces (i.e., one for each required instance of the portion) from any of the hosts, each with a size of five computational resource units (which is the amount of computation resource units required to execute components 208, 210 together). Resource manager 320 allocates four computational resource units on the first host 336, seven computational resource units on the second host 338, and nine computational resource units on the third host 340. Resource manager 320 then responds with message 362 indicating that it was able to allocate the requested computational resources and request 360 is therefore fulfilled. With four workspaces, each including five computational resource units allocated for the second portion of data processing graph 200, the second portion is 100% fulfilled, as is required for data processing graph 200 to execute.

Figure 5:
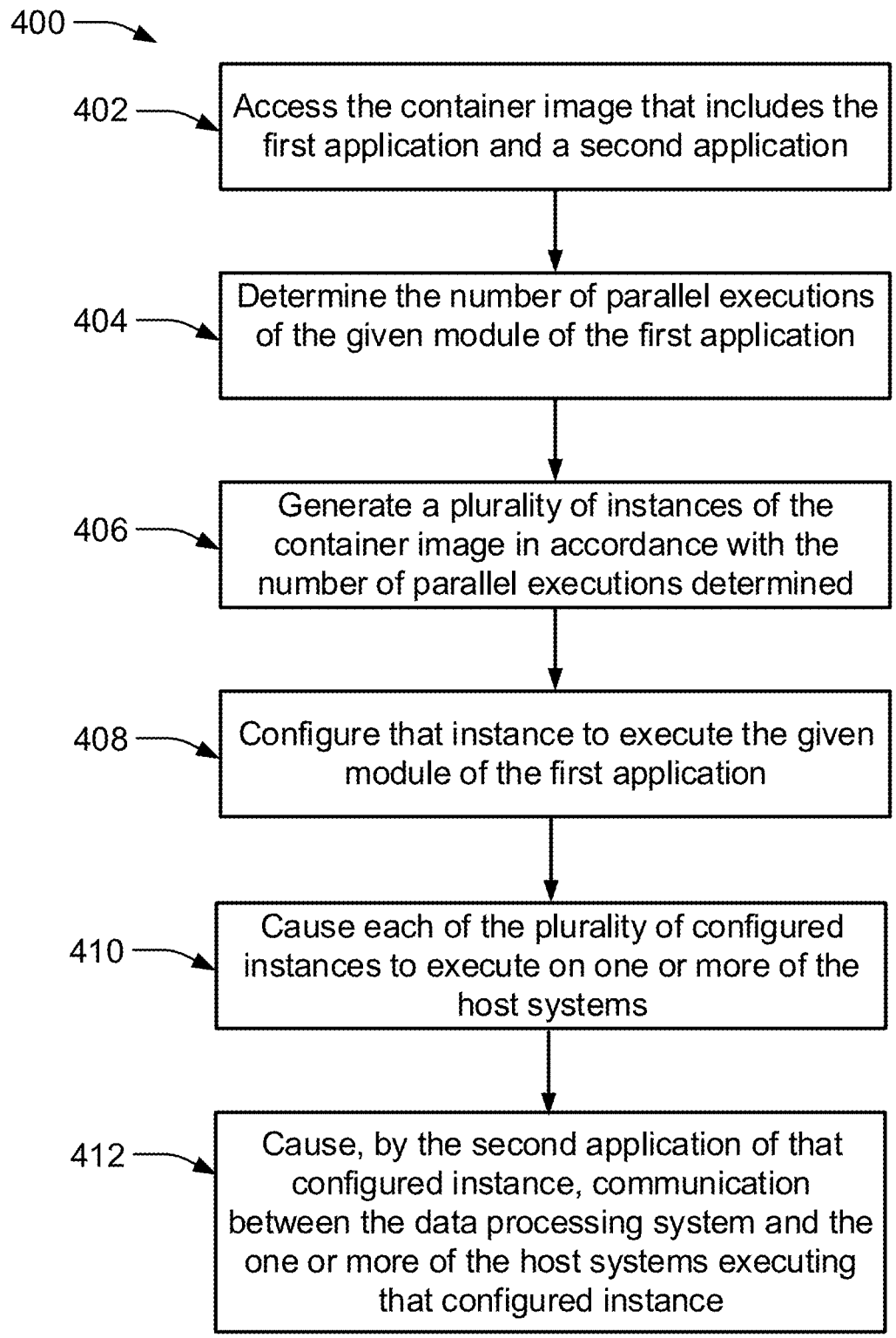
FIG. 5 is a flowchart of a process for dynamic distribution of container images.

Referring to FIG. 5, process 400 is shown for launching a plurality of instances of a specified image in accordance with a dynamic layout, with the specified image including an multi-component program (e.g., a data processing graph) with a plurality of executable components and the dynamic layout specifying, for each of one or more of the executable components, an amount of parallelism implemented in executing that executable component.

In this example, process 400 is implemented by a data processing system (e.g., execution system 106) for causing execution of instances of a container image on a plurality of host systems, wherein each container image includes a first application with a plurality of modules, and wherein the instances are configured to execute a given module in accordance with a determined number of parallel executions of that given module. In operation, the data processing system accesses (402), from data storage 115 (FIG. 1), the container image 119 (FIG. 1) that includes the first application (e.g., application 109 in FIG. 1) and a second application (e.g., agent service 107 in FIG. 1), wherein the second application causes a communication between the data processing system and a host system (e.g., host system 120 in FIG. 1) executing an instance (e.g., instance 104 or instance 105 in FIG. 1) of the container image. The data processing system determines (404) the number of parallel executions of the given module (e.g., module 130a in FIG. 2C) of the first application.

For the given module, the data processing system generates (406) one or multiple instances (instances 122a-122c in FIG. 2C) of the container image in accordance with the number of parallel executions determined, with each instance including the first and second applications. For each instance, the data processing system configures (408) that instance to execute the given module of the first application, e.g., by transmitting instructions from launcher sub-system 112 to instance 122a on which module to execute.

The data processing system causes (410) each of the plurality of configured instances to execute on one or more of the host systems. For at least one of the plurality of configured instances, the data processing system causes (412), by the second application of that configured instance, communication between the data processing system and the one or more of the host systems executing that configured instance.

Elastic Processing With Containers and Dynamic Layouts

The techniques described herein enable elastic processing with containers and dynamic layouts. In particular, over time, there has been these trends of increased virtualization, and, to a certain extent, separation of compute from disk location. As such, there may be a cluster of servers and applications may need to be executed where the resources are free. For example, a server ("Server A") may be busy because an application is running long today on server A, but the cluster has an empty server ("server B"). In this example, the application will run on server B today. But, tomorrow another application that is running on server B may be running long. As such, tomorrow, the application runs on server A. In a static configuration, the configuration of which servers execute which application is static or specified ahead of time. In a dynamic configuration, or dynamic layout, the configuration of which servers execute which application and when is flexible, depending on available resources. The combination of executable programs and container technology provides the ability to run scalable distributed parallel applications over resources that are available at a point of time when the application is launched.

Containers are fundamentally a mechanism of controlling what a process can see and what it can access within a system. These can be leveraged to implement strategies that are very similar to achieved performance by virtualizing platforms to run on virtual machines (VMs). However, containers are much lighter weight than virtual machines. One of the issues with virtual machines is that when a VM is run, a complete copy of the operating system is run, and that's several gigabytes of disk space that's consumed, and at run time, that's several gigabytes of memory. With container technology, a kernel (e.g., a Linux kernel) is shared. The disk footprint is also shared. As such, containers are more efficient than virtual machines. I/O performance is substantially improved with containers. Disk footprint and memory footprint is lower. Startup time is drastically reduced. Since an application is running inside of a container, the operating system is already up and running. If a virtual machine is brought up, the application has to wait for the operating system to boot. Containers provide predictable environments. So, what has been tested in development is what's run in production. Containers also provide isolation. So, if one application needs patching or error fixing, the patching of that application won't impact another application.

Scaling Out Across a Cluster

Dataflow graphs (e.g., data processing graphs) and other execution applications execute in these container platforms, whether a micro-service architecture or large scale batch applications are being implemented. When a container is run, the container just runs that one graph. So, for service architectures, multiple instances of the containers are implemented. Batch graphs could be run inside of a single container, but implementation would be constrained to the resources that are available to a single container, and by definition, a container is constrained to what's available in the machine it's running on. This does not really provide the flexibility to scale out across as many servers as are available and to give access to as much compute capacity as actually needed. So to scale a batch graph out and run across a cluster where there are lots of cores and lots of memory resources available, dynamic layouts are implemented.

Expanding Dynamic Layouts

Through dynamic layouts, applications are able to run distributed and parallel across multiple servers. Additionally, through container technology, an application can be packaged up such that it is isolated. Through the techniques described herein, the system implements and take advantage of batch graphs, containers, dynamic layouts, and expandable resources. For example, the graphs and operating systems provide support for a dynamic layout working with containers. As such, a developer can write a graph and define a dynamic layout for components in that graph and specify a container infrastructure that has a cluster of compute resources, and that the graph should be executed across the cluster. The developer can simply plug into a dynamic layout parameter of the graph the number of ways the graph or particular components in that graph should run in parallel. That is, rather than running a container and all the logic and everything inside, one instance, the system is configured to execute multiple containers based on how many ways parallel the application is specified to run and then have the application be able to expand (e.g., be executed across) those containers dynamically.

At run time, when that container comes up, the system described herein will communicate with an orchestration platform (e.g., Kubernetes®, Marathon, YARN, or another schedulers), and ensure that the graph will execute across the entire cluster, data will stream around, and the graph will make use of the compute memory resources that are available in the cluster. All of this is achieved through the dynamic layout parameter in in configuring the dataflow graph. The combination of dynamic layouts with containers enables multiple containers be implemented in executing a single application.

That is, through containerization technology and dynamic layouts, the system described herein can execute multiple instances of a container, and leverage those instances to get scalability across a batch application. Through containers and dynamic layouts, the system described herein is completely scalable and dynamic and has elastic compute capacity independent of where storage actually exists.

The techniques described herein can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for an extended period of time (e.g., the time between refresh periods of a dynamic memory device such as a dynamic RAM). In preparation for loading the instructions included in the software stored in non-transitory form, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

The invention claimed is:

1. A method implemented by a data processing system for enabling an application in a container image to execute across host systems by assigning instances of the container image to the host systems and enabling a portion of the application in an instance on a host system to output data to another portion of the application in another instance on another host system, the method including:
   accessing the container image that includes a first application and a second application, wherein the first application includes a first portion and a second portion, and wherein the second application causes a communication between the data processing system and a host system for executing an instance of the container image;
   determining, by the data processing system, a number of parallel executions of the first application;
   generating a plurality of instances of the container image in accordance with the number of parallel executions determined, with an instance including the first and second applications;
   configuring a first instance to execute the first portion of the first application on a first host system;
   causing each of a plurality of configured instances to execute on one or more of the host systems;
   receiving, from the second application of a second instance on a second host system, a communication;
   based on the communication received from the second application of the second instance on the second host system, transmitting, by the data processing system to the first instance on the first host system, information for the first instance to locate the second portion of the first application of the second instance on the second host system to receive an output from the first portion of the first application, wherein the second portion of the first application on the second host system is configured to receive the output from the first portion of the first application on the first host system; and
   based on the transmitted information to locate the second portion of the first application, causing the first portion of the first application of the first instance on the first host system to transmit its output data to the second portion of the first application of the second instance on the second host system, wherein the second portion of the first application is located by the information transmitted to the first instance of the container image on the first host system.

2. The method of claim 1, further including accessing a specification that specifies the number of parallel executions of the first application.

3. The method of claim 1, further including:
   assigning each of the plurality of configured instances to execute on one or more of the host systems.

4. The method of claim 3, wherein assigning is dynamically performed by each configured instance being assigned at run-time and not being pre-determined.

5. The method of claim 4, wherein the first application is a dataflow graph with a plurality of components, further including:
   for each component, generating a plurality of instances of the container image in accordance with a number of parallel executions determined for that component; and
   dynamically running a dataflow graph on multiple nodes to obtain dynamic levels of parallelism by:
     for each component,
       dynamically assigning a generated instance to one or more nodes of the host systems; and
       causing each of the plurality of assigned instances to execute on the one or more nodes of the host systems.

6. The method of claim 1, wherein the communication includes monitor data to track when a portion of an application has completed execution for the data processing system to instruct another portion to execute.

7. The method of claim 1, wherein the communication specifies an address of the second instance or addressing information of the second instance.

8. The method of claim 1, wherein causing the first portion on the first host system to transmit its output data to the second portion on the second host system includes:
   instructing the first portion on the first host system to transmit its output data to the second portion on the second host system.

9. One or more machine-readable hardware storage devices for enabling an application in a container image to execute across host systems by assigning instances of the container image to the host systems and enabling a portion of the application in an instance on a host system to output data to another portion of the application in another instance on another host system, the one or more machine-readable hardware storage devices storing instructions that are executable by one or more processing devices to perform operations including:

accessing the container image that includes a first application and a second application, wherein the first application includes a first portion and a second portion, and wherein the second application causes a communication between the data processing system and a host system for executing an instance of the container image;

determining, by the data processing system, a number of parallel executions of the first application;

generating a plurality of instances of the container image in accordance with the number of parallel executions determined, with an instance including the first and second applications;

configuring a first instance to execute the first portion of the first application on a first host system;

causing each of a plurality of configured instances to execute on one or more of the host systems;

receiving, from the second application of a second instance on a second host system, a communication;

based on the communication received from the second application of the second instance on the second host system, transmitting, by the data processing system to the first instance on the first host system, information for the first instance to locate the second portion of the first application of the second instance on the second host system to receive an output from the first portion of the first application, wherein the second portion of the first application on the second host system is configured to receive the output from the first portion of the first application on the first host system; and based on the transmitted information to locate the second portion of the first application, causing the first portion of the first application of the first instance on the first host system to transmit its output data to the second portion of the first application of the second instance on the second host system, wherein the second portion of the first application is located by the information transmitted to the first instance of the container image on the first host system.

10. The one or more machine-readable hardware storage devices of claim 9, the operations further including accessing a specification that specifies the number of parallel executions of the first application.

11. The one or more machine-readable hardware storage devices of claim 9, the operations further including:

assigning each of the plurality of configured instances to execute on one or more of the host systems.

12. The one or more machine-readable hardware storage devices of claim 11, wherein assigning is dynamically performed by each configured instance being assigned at run-time and not being pre-determined.

13. The one or more machine-readable hardware storage devices of claim 12, wherein the first application is a dataflow graph with a plurality of components, the operations further including:

for each component, generating a plurality of instances of the container image in accordance with a number of parallel executions determined for that component; and dynamically running a dataflow graph on multiple nodes to obtain dynamic levels of parallelism by:

for each component, dynamically assigning a generated instance to one or more nodes of the host systems; and causing each of the plurality of assigned instances to execute on the one or more nodes of the host systems.

14. The one or more machine-readable hardware storage devices of claim 9, wherein the communication includes monitor data to track when a portion of an application has completed execution for the data processing system to instruct another portion to execute.

15. The one or more machine-readable hardware storage devices of claim 9, wherein the communication specifies an address of the second instance or addressing information of the second instance.

16. The one or more machine-readable hardware storage devices of claim 9, wherein causing the first portion on the first host system to transmit its output data to the second portion on the second host system includes:

instructing the first portion on the first host system to transmit its output data to the second portion on the second host system.

17. A data processing system for enabling an application in a container image to execute across host systems by assigning instances of the container image to the host systems and enabling a portion of the application in an instance on a host system to output data to another portion of the application in another instance on another host system, including:

one or more processing devices; and one or more machine-readable hardware storage devices storing instructions that are executable by the one or more processing devices to perform operations including:

accessing the container image that includes a first application and a second application, wherein the first application includes a first portion and a second portion, and wherein the second application causes a communication between the data processing system and a host system for executing an instance of the container image;

determining, by the data processing system, a number of parallel executions of the first application;

generating a plurality of instances of the container image in accordance with the number of parallel executions determined, with an instance including the first and second applications;

configuring a first instance to execute the first portion of the first application on a first host system;

causing each of a plurality of configured instances to execute on one or more of the host systems;

receiving, from the second application of a second instance on a second host system, a communication;

based on the communication received from the second application of the second instance on the second host system, transmitting, by the data processing system to the first instance on the first host system, information for the first instance to locate the second portion of the first application of the second instance on the second host system to receive an output from the first portion of the first application, wherein the second portion of the first application on the second host system is configured to receive the output from the first portion of the first application on the first host system; and based on the transmitted information to locate the second portion of the first application, causing the first portion of the first application of the first instance on the first host system to transmit its output data to the second portion of the first application of the second instance on the second host system, wherein the second portion of the first application is located by the information transmitted to the first instance of the container image on the first host system.

18. The data processing system of claim 17, the operations further including accessing a specification that specifies the number of parallel executions of the first application.

19. The data processing system of claim 17, the operations further including:

assigning each of the plurality of configured instances to execute on one or more of the host systems.

20. The data processing system of claim 19, wherein assigning is dynamically performed by each configured instance being assigned at run-time and not being pre-determined.

21. The data processing system of claim 20, wherein the first application is a dataflow graph with a plurality of components, the operations further including:

for each component, generating a plurality of instances of the container image in accordance with a number of parallel executions determined for that component; and dynamically running a dataflow graph on multiple nodes to obtain dynamic levels of parallelism by:

for each component, dynamically assigning a generated instance to one or more nodes of the host systems; and causing each of the plurality of assigned instances to execute on the one or more nodes of the host systems.

22. The data processing system of claim 17, wherein the communication includes monitor data to track when a portion of an application has completed execution for the data processing system to instruct another portion to execute.

23. The data processing system of claim 17, wherein the communication specifies an address of the second instance or addressing information of the second instance.

24. The data processing system of claim 17, wherein causing the first portion on the first host system to transmit its output data to the second portion on the second host system includes:

instructing the first portion on the first host system to transmit its output data to the second portion on the second host system.

* * * * *

UNITED STATES PATENT AND TRADEMARK OFFICE
CERTIFICATE OF CORRECTION

PATENT NO. : 12,307,262 B2
APPLICATION NO. : 18/492173
DATED : May 20, 2025
INVENTOR(S) : Frank Lynch and Tim Wakeling Page 1 of 1

It is certified that error appears in the above-identified patent and that said Letters Patent is hereby corrected as shown below:

In the Specification

Column 1, Line 6 (approx.), after "application", insert -- is a continuation of U.S. Patent Application Serial No. 16/656,886, filed on October 18, 2019, which --

Column 1, Line 8 (approx.), after "contents of", insert -- each of --

Signed and Sealed this
Eighth Day of July, 2025

Coke Morgan Stewart
*Acting Director of the United States Patent and Trademark Office*